(12) United States Patent
Kim et al.

(10) Patent No.: US 12,040,463 B2
(45) Date of Patent: Jul. 16, 2024

(54) NICKEL-RICH BATTERY RECYCLING

(71) Applicant: Ascend Elements, Inc., Westborough, MA (US)

(72) Inventors: Kee-Chan Kim, Westborough, MA (US); Eric Gratz, Westborough, MA (US)

(73) Assignee: Ascend Elements, Inc., Westborough, MA (US)

( * ) Notice: Subject to any disclaimer, the term of this patent is extended or adjusted under 35 U.S.C. 154(b) by 0 days.

(21) Appl. No.: 17/964,412

(22) Filed: Oct. 12, 2022

(65) Prior Publication Data

US 2024/0113350 A1 Apr. 4, 2024

Related U.S. Application Data

(60) Provisional application No. 63/412,025, filed on Sep. 30, 2022.

(51) Int. Cl.
*H01M 10/54* (2006.01)
*C22B 7/00* (2006.01)
*C22B 26/12* (2006.01)

(52) U.S. Cl.
CPC ............. *H01M 10/54* (2013.01); *C22B 7/007* (2013.01); *C22B 26/12* (2013.01)

(58) Field of Classification Search
USPC ...................................................... 423/179.5
See application file for complete search history.

(56) References Cited

U.S. PATENT DOCUMENTS 2,516,109 A * 7/1950 Ellestad .................. C22B 26/12
423/179.5
2019/0024212 A1* 1/2019 Lien ........................ C22B 26/12

FOREIGN PATENT DOCUMENTS

| CN | 102956935 A | 3/2013 |
| JP | 2019026916 A | 2/2019 |
| JP | 2019160429 A | 9/2019 |
| KR | 1020200022514 A | 3/2020 |

(Continued)

OTHER PUBLICATIONS

L.F. Guimarães, A.B. Botelho Junior, D.C.R. Espinosa. "Sulfuric acid leaching of metals from waste Li-ion batteries without using reducing agent", Minerals Engineering, vol. 183, 2022, 107597, ISSN 0892-6875, https://doi.org/10.1016/j.mineng.2022.107597.(Year: 2022).*

(Continued)

*Primary Examiner* — Anthony J Zimmer
*Assistant Examiner* — Zachary John Baum
(74) *Attorney, Agent, or Firm* — Armis IP Law, LLC

(57) ABSTRACT

A battery recycling process recovers lithium from nickel-rich cathode material in a recycling stream of end-of-life batteries. A dilute acid leach of a high nickel content cathode material contains a mixture of sulfuric acid based on a molar quantity of lithium in the cathode material. The highly selective leach generates a lithium rich solution with a small amount of nickel removable by nanofiltration to achieve a highly efficient recovery of the lithium contained in the recycling stream. A quantity of the leach acid based on the lithium content and a quantity of water based on a total black mass of the recycling stream results in a highly selective, near pure lithium leach when the recycling stream results from high nickel NMC batteries such as 811.

14 Claims, 4 Drawing Sheets

(56) References Cited

FOREIGN PATENT DOCUMENTS

KR     20200138496 A  * 12/2020
WO     2017091562 A1   6/2017

OTHER PUBLICATIONS

English translation of KR 20200138496 A Description (Year: 2020).*
International Search Report, PCT/US2022/05213, Jun. 26, 2023, pp. 1-4.

* cited by examiner

NICKEL-RICH BATTERY RECYCLING

RELATED APPLICATIONS

This patent application claims the benefit under 35 U.S.C. § 119(e) of U.S. Provisional Patent App. No. 63/412,025, filed Sep. 30, 2022, entitled "NICKEL-RICH BATTERY RECYCLING," incorporated herein by reference in entirety.

BACKGROUND

Lithium-ion (Li-ion) batteries are a preferred chemistry for secondary (rechargeable) batteries in high discharge applications such as electrical vehicles (EVs) and power tools where electric motors are called upon for rapid acceleration. Li-ion batteries include a charge material, conductive powder and binder applied to or deposited on a current collector, typically a planar sheet of copper or aluminum. The charge material includes anode material, typically graphite or carbon, and cathode material, which includes a predetermined ratio of metals such as lithium, nickel, manganese, cobalt, aluminum, iron and phosphorous, defining a so-called "battery chemistry" of the Li-ion cells. The preferred battery chemistry varies between vendors and applications, and recycling efforts of Li-ion batteries typically adhere to a prescribed molar ratio of the battery chemistry in recycled charge material products. Industry trends are moving towards a more nickel-rich chemistry, often preferring nickel, manganese and cobalt (NMC) in molar ratios of N:M:C such as 5:3:2 (532), 6:2:2 (622) and 8:1:1 (811).

SUMMARY

A battery recycling process recovers lithium from nickel-rich cathode material in a recycling stream of end-of-life batteries. A dilute acid leach of a high nickel content cathode material contains a mixture of sulfuric acid based on a molar quantity of lithium in the cathode material. The highly selective leach generates a lithium rich solution with a small amount of nickel removable by nanofiltration to achieve a highly efficient recovery of the lithium contained in the recycling stream. A quantity of the leach acid based on the lithium content and a quantity of water based on a total black mass of the recycling stream results in a highly selective, near pure lithium leach when the recycling stream results from high nickel NMC batteries such as 811.

Configurations herein are based, in part, on the observation that as numerous electric vehicles attain the end of their service life, a potentially large recycling stream results from the charge material that might otherwise generate a harmful waste source. Unfortunately, conventional approaches to EV battery recycling tend to focus on the nickel, manganese and cobalt that form a crucial ratio in the battery chemistry. Lithium had often been overlooked as a lucrative recycling target as it enjoyed relative abundance to the other cathode material metals. Accordingly, configurations herein substantially overcome the shortcoming of conventional EV battery recycling by recovering lithium from the cathode material by selectively leaching lithium from the black mass of granular anode and cathode materials present in a comingled recycling stream from agitated and dismantled batteries.

In further detail, configurations herein demonstrate beneficial enhancements resulting from a method for recycling Li from batteries by combining a granular mass of a charge material in a recycling stream from batteries having a lithium based charge material having a high molar ratio of nickel and a leach acid in an amount based on a molar quantity of lithium in the granular mass. The combined granular mass and leach acid are heated for recovering the lithium from the granular mass, resulting in a leach selectivity of substantially all lithium with only minor impurities of residual materials including nickel, cobalt and manganese.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example method and approach for recycling batteries such as nickel rich (NMC 811, or at least 80% nickel cathode material) for selectively yielding lithium with small amounts of nickel and negligible cobalt and manganese. Lithium-ion batteries have been used for many applications and are becoming more and more important for electronic devices, electric vehicles, and energy storage systems. In order to meet the emerging EV requirements, increasing lithium demand strains natural sources (mining, separating/concentrating from sea or lake waters) or recycled from the spent lithium-ion batteries. The relevant natural resources are limited, and the conventional recycling processes have a highly negative impact to the environment. Spent (meaning end-of-life and/or exhausted) lithium-ion batteries are viable resources for lithium, and represent higher lithium densities than most of the natural resources. High nickel ternary or quaternary batteries are gathering more attention due the higher energy capacity and lower raw materials cost. The high nickel batteries will reach to their end of life within 5-10 years and they will comprise the bulk of spent lithium-ion batteries. Front-end lithium recovery methods from black mass are becoming more important to save lithium from the spent batteries. Therefore, it is beneficial to develop a method for front end, highly selective lithium leaching and recovery from high nickel NMC or NCMA batteries, which is going to define a large share of spent EV batteries in the near future.

Figure 1:
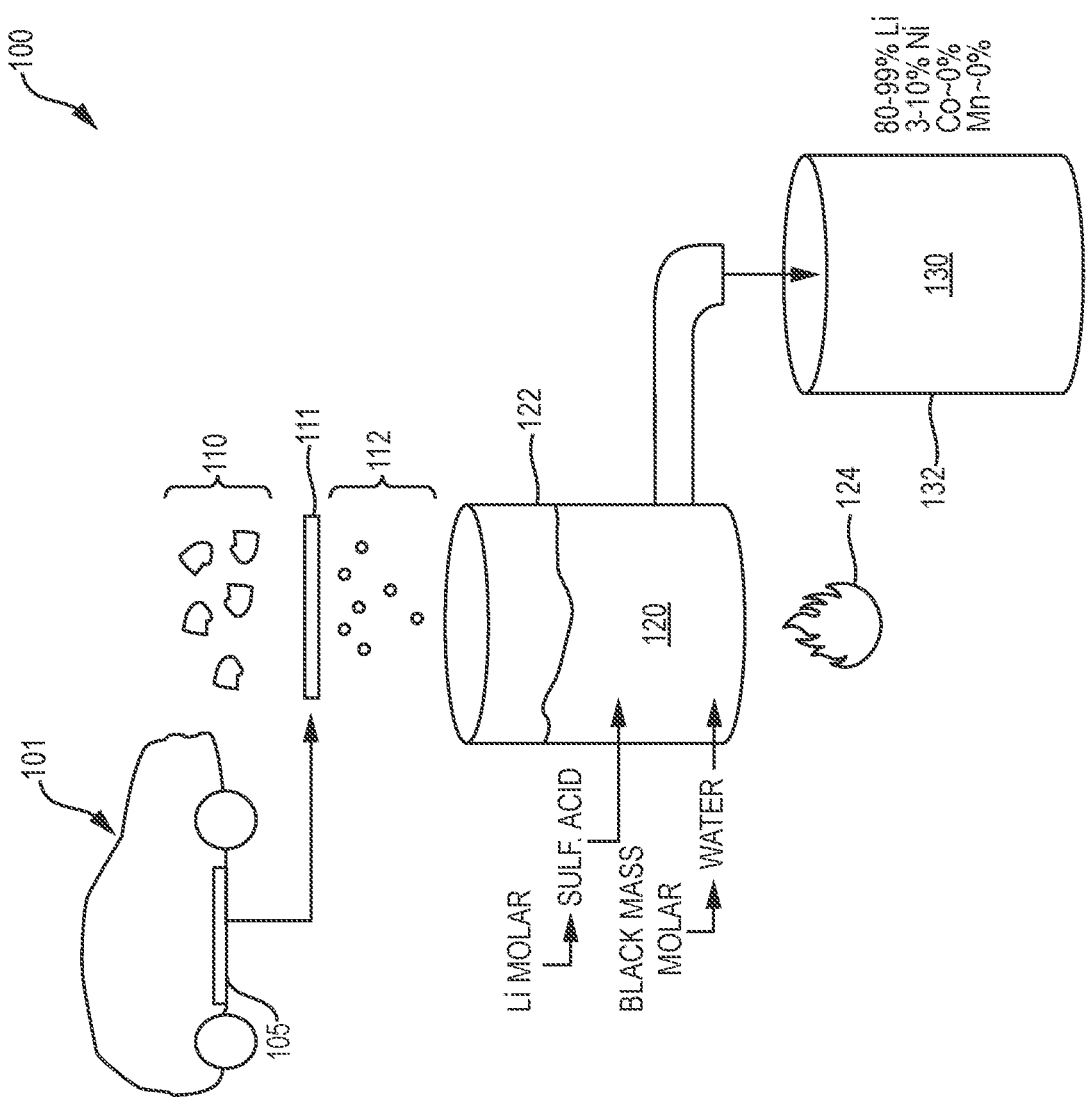
FIG. 1 is a context diagram of a recycling environment suitable for use with configurations herein.

FIG. 1 is a context diagram of an embodiment of a recycling environment suitable for use with configurations herein. Referring to FIG. 1, in a battery recycling environment 100, a recycling stream 101 yields granulated battery casing 110, current collectors 111, and charge material 112, resulting from agitation (e.g. crushing, grinding, pulverizing) of the end-of-life batteries. 105. The agitated, dismantled batteries often result in a comingled arrangement including a black mass, denoting a mixture of both cathode materials (typically NMC) and anode materials (graphite and carbon). Various other impurities, such as physical casing, and iron, aluminum and copper resulting from the current collectors and internal contacts may also appear. Specific configurations herein provide that lithium is selectively leached from the spent high nickel NMC ternary and/or NMCA quaternary lithium-ion batteries with dilute sulfuric acids.

The disclosed approach is most optimal when a percent of Ni among the cathode metals in the batteries is 80% or higher. The black mass containing cathode materials is combined in a leach mixture 120 along with a solution of leach acid, such as sulfuric acid, and water. A containment 122 receives the black mass with the leach acid (sulfuric acid in this embodiment). Preferably, the leach acid to lithium molar ratio is 0.4-0.7 (such as 0.45-0.7 or 0.45-0.6) and the water (volume)-to-Black mass solid (weight) ratio is 1-5. In other words, the sulfuric acid is based on the molar quantity of Li and the water is based on the weight of the black mass.

In the containment 122 vessel, a heat source 124 provides a reaction temperature of 60° C.-100° C. for a reaction time of 1-6 hours. A resulting product 130 from the leachate in the containment 122 results in lithium leaching of 80-99% while nickel leaching is less than 3-10% and cobalt and manganese leaching rates are negligible. The nickel impurity in the leachate is removable by nanofiltration. The lithium in the product 130 is recovered as $Li_2SO_4$ by crystallization or converted to LiOH by adding $Ca(OH)_2$, CaO, $Mg(OH)_2$ or MgO to $Li_2CO_3$ by adding $Na_2CO_3$, or to LiF by adding NaF or HF.

Figure 2:
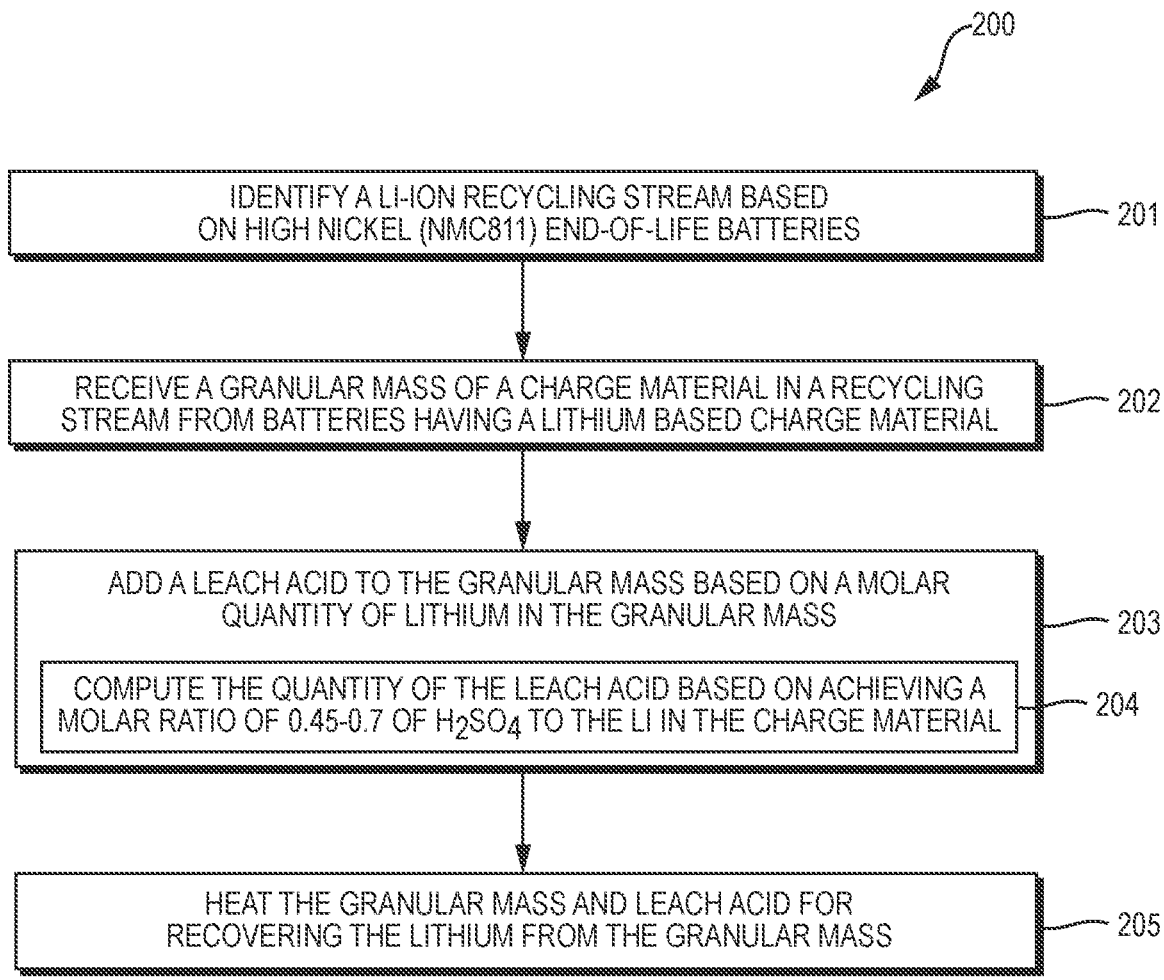
FIG. 2 is a flowchart of lithium recycling in the environment of FIG. 1.

FIG. 2 is a flowchart 200 of lithium recycling in the environment of FIG. 1. Referring to FIGS. 1 and 2, the method for recycling lithium from Li-ion batteries includes, at step 201, identifying a Li-ion recycling stream based on high nickel (NMC811 or higher) end-of-life batteries. Selective leaching of the lithium occurs most readily with a high concentration of nickel in the charge material/black mass. This may be due to the ability of nickel to be easily reduced from $Ni^{3+}$ to $Ni^{2+}$ in the presence of the leach acid. At step 202, a granular mass of the charge material is received in a recycling stream from batteries having the high-nickel, lithium-based charge material, and a leach acid is combined with the granular mass based on a molar quantity of lithium in the granular mass, as depicted at step 203. Sulfuric acid may be employed as the leach acid, and alternatively, hydrochloric acid, acetic acid, nitric acid, formic acid, oxalic acid, boric acid or other suitable organic or inorganic acid may be employed based on an ability to selectively dissolve the lithium without introducing excessive nickel in the leach solution.

This includes computing or otherwise determining the quantity of the leach acid based on achieving a molar ratio of 0.45-0.7 of $H_2SO_4$ to Li in the charge material, as shown at step 204. The acid quantity may be generalized to be around 2-1 lithium to sulfate, thus the acid quantity is based on the molar ratio of the lithium in the cathode portion of the black mass. Battery construction will dictate the proportion of cathode to anode material, substantially equal in most cases, and the battery chemistry indicates the metals combined with the lithium to define the cathode material. Recall that leaching is most selective when the nickel is around 80% of the cathode material.

The heat source 124 heats the mixture 120 of granular mass and leach acid for recovering the lithium from the granular mass for achieving highly selective lithium leaching over several hours.

The disclosed approach provides a simple, unique, and cost-effective method for recycling lithium. In a general configuration, high nickel NMC or NMCA black mass (BM) is dispersed in a known amount of a dilute sulfuric acid solution ($H_2SO_4$/Cathode molar ratio=0.45-0.70; $H_2O(v)$/BM(w) ratio=1-5). The mixture is then agitated at 60-100° C. for 1-6 hours. After the reaction, the mixture is filtered with a 1 micron filter membrane. Then the nickel impurity is removed by nanofiltration (NF). The impurity removed permeate from the nanofiltration is lithium sulfate solution. The solution is further concentrated by reverse osmosis (RO) filtration, and then lithium sulfate is crystallized from the concentrate by further evaporation. The lithium in the RO concentrate can be recovered as a $Li_2CO_3$ precipitate by adding sodium carbonate or as a lithium halide by precipitating with sodium fluoride or hydrofluoric acid. The lithium sulfate in the RO concentrate can also be converted to lithium hydroxide by adding calcium, magnesium hydroxide or magnesium oxide, removing the byproduct calcium or magnesium sulfate precipitate by ultrafiltration, and then crystallizing LiOH from the filtrate.

Figure 3:
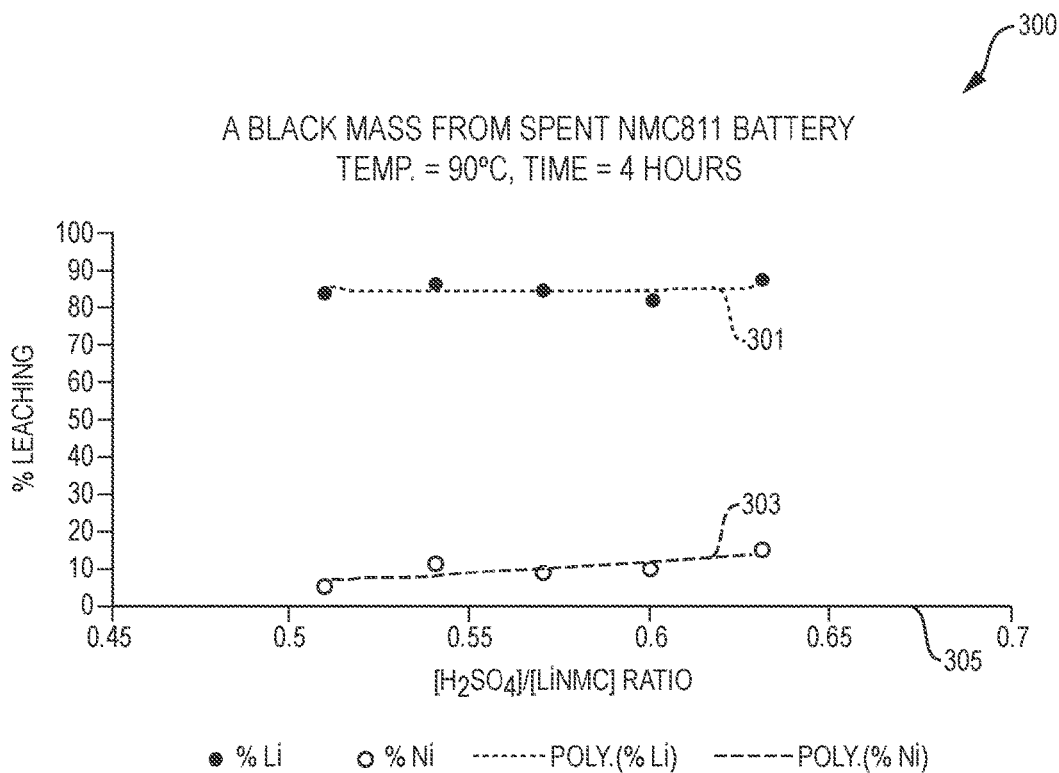
FIG. 3 is a graph of leaching selectivity based on a ratio of lithium to sulfuric acid.

FIG. 3 is a graph 300 of leaching selectivity based on a ratio of lithium to sulfuric acid. In FIG. 3, a leached percentage of Li (301) is shown along with the leached percentage of Ni (303), which can be subsequently removed to yield substantially pure lithium sulfate, and at various ratios of sulfuric acid to Li on the horizontal axis 305. The disclosed results show high lithium leaching and selectivity. Only a low percent Ni is leached along with Li, which is preferably 10% or less. Amounts of leached Co and Mn is negligible.

Figure 4:
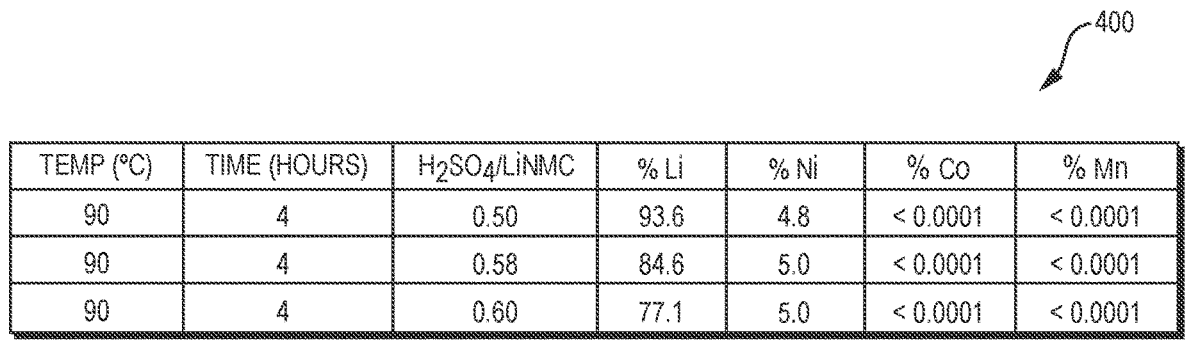
FIG. 4 shows a chart of quantitative results of leaching as in FIGS. 1-3.

FIG. 4 shows a chart 400 of quantitative results of leaching as in FIGS. 1-3. Referring to FIG. 4, three leach trials are shown with varied molar ratios of leach acid to lithium and demonstrating a substantial recovery of Li with minimal leaching of Ni.

Figure 5:
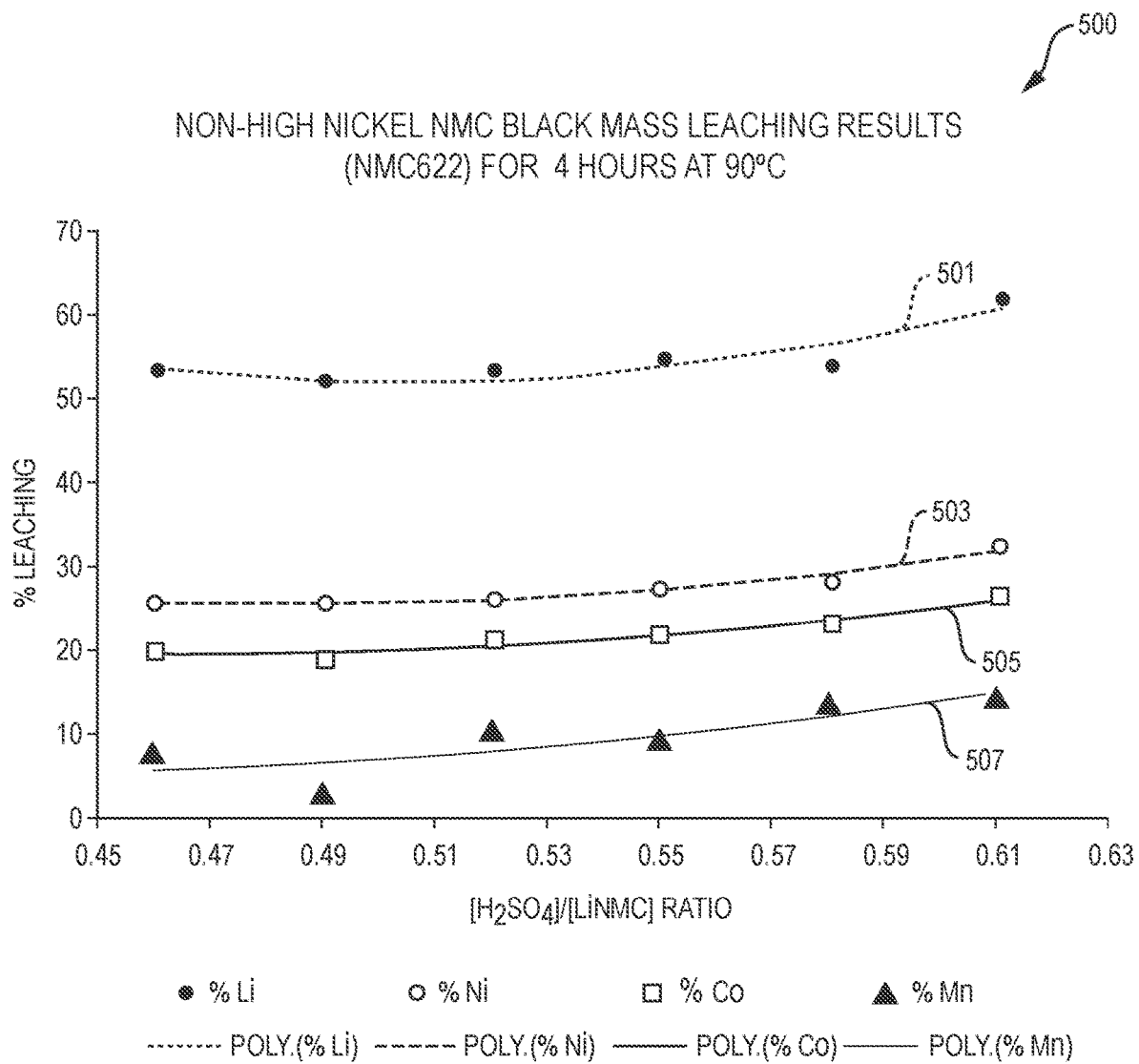
FIG. 5 shows converse results of leaching using non-high nickel charge material.

FIG. 5 shows converse results 500 of leaching using non-high nickel charge material. As indicated above, a high nickel content in the cathode material, which is at least 80% Ni, such as with NMC-811, contributes to the highly selective nature of leach recovery of substantially all lithium. FIG. 5 illustrates a difference with a lower nickel charge material such as NMC-622. While lithium (501) is still a majority of the leached metals, the other cathode material metals appear in greater and undesirable quantities. For example, Ni content (503) is the next highest leach yield, followed by Co (505) and Mn (507).

In a particular configuration, the disclosed method for recycling lithium from high nickel lithium batteries includes agitating a recycling stream of end-of-life lithium batteries to generate a black mass of high nickel cathode materials including cathode material of at least 80% nickel, and determining a quantity of sulfuric acid based on a molar quantity of lithium in the black mass for achieving a molar ratio in a range between 0.4-0.70 of $H_2SO_4$—Li, or generally around 2-1 lithium to acid, or more specifically 2.0 moles of Li to 1.0-1.2 moles of sulfuric acid. The approach combines the determined quantity of sulfuric acid and the black mass to form a leach mixture, and then mixes and heats the leach mixture between 60°-80° C. for 1-6 hours. The leach mixture is filtered with a 1 micron filter membrane for removing undissolved materials from the black mass, and dissolved nickel is removed from the leach mixture via nanofiltration to yield a lithium sulfate solution including dissolved Li from the black mass. Recycled charge material precursor can be recovered by concentrating the lithium sulfate via reverse osmosis and evaporation to a crystalline form.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for recycling lithium from batteries, comprising:
   combining a quantity of leach acid and a quantity of a granular mass of a charge material from a battery recycling stream, the granular mass comprising at least 80 mol % nickel and the quantity of leach acid based on a molar quantity of lithium in the granular mass;
   heating the combined granular mass and leach acid; and
   recovering lithium from the granular mass, the recovered lithium comprising less than 10% nickel.

2. The method of claim 1, wherein the granular mass of charge material comprises a cathode material having at least 80 mol % nickel of cathode material metals in the granular mass.

3. The method of claim 1 wherein the quantity of the leach acid is based on achieving a molar ratio of 0.4-0.7 of the leach acid to Li in the granular mass of charge material.

4. The method of claim 1 wherein the granular mass of the charge material is received from a recycling stream of batteries having a lithium-based charge material.

5. The method of claim 1 wherein the molar ratio of the leach acid to Li in the granular mass is 0.045-0.6.

6. The method of claim 1 wherein the combined granular mass and leach acid is heated to 60-100° C.

7. The method of claim 1 wherein the leach acid is sulfuric acid.

8. The method of claim 1 wherein the lithium recovered from the granular mass comprises between 3%-10% nickel.

9. The method of claim 1 further comprising agitating waste batteries for generating a comingled mass of charge material, current collectors and casing; and separating the charge material in a granular form.

10. The method of claim 1 further comprising:
    sourcing the granular mass of charge material from a recycling stream including batteries based on an NMC 811 chemistry.

11. The method of claim 1 wherein the leach agent includes acids selected from the group consisting of sulfuric, hydrochloric, acetic, nitric, formic, oxalic and boric.

12. A method for recycling lithium from high nickel lithium batteries, comprising:
    agitating a recycling stream of end-of-life lithium batteries to generate a black mass of high nickel cathode materials including cathode material of at least 80% nickel of cathode material metals in the granular mass;
    determining a quantity of a leaching acid based on a molar quantity of lithium in the black mass for achieving a molar ratio in a range between 0.4-0.70 of leach acid to Li in the black mass;
    adding the determined quantity of leaching acid to the black mass to form a leach mixture;
    mixing and heating the leach mixture between 60°-80° C. for 1-6 hours;
    filtering the leach mixture with a 1 micron filter membrane for removing undissolved materials;
    removing dissolved nickel from the leach mixture via nanofiltration to yield a lithium sulfate solution including dissolved Li from the black mass;
    concentrating the lithium sulfate via reverse osmosis and evaporation to a crystalline form of recovered lithium such that the recovered lithium comprises less than 10% nickel.

13. The method of claim 12 wherein the leach acid is sulfuric acid.

14. The method of claim 12, wherein the molar ratio is in a range of between 0.45-0.6.

* * * * *